(12) United States Patent
Ducheneaut et al.

(10) Patent No.: US 8,616,970 B2
(45) Date of Patent: Dec. 31, 2013

(54) SYSTEM AND METHOD FOR MANAGING A MULTIPLICITY OF TEXT MESSAGES IN AN ONLINE GAME

(75) Inventors: Nicolas B. Ducheneaut, Sunnyvale, CA (US); Eric S. Nickell, Los Gatos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1084 days.

(21) Appl. No.: 12/099,059

(22) Filed: Apr. 7, 2008

(65) Prior Publication Data
US 2009/0253513 A1 Oct. 8, 2009

(51) Int. Cl.
*A63F 9/24* (2006.01)

(52) U.S. Cl.
USPC ............ 463/31; 463/30; 463/42; 463/9

(58) Field of Classification Search
USPC ............ 463/31, 42, 9, 30; 709/206, 207, 224
See application file for complete search history.

(56) References Cited

U.S. PATENT DOCUMENTS

| | | | |
|---|---|---|---|
| 5,026,051 A | 6/1991 | Lowe et al. | |
| 5,337,363 A | 8/1994 | Platt | |
| 5,556,107 A | 9/1996 | Carter | |
| 5,736,982 A | 4/1998 | Suzuki et al. | |
| 5,754,660 A | 5/1998 | Shimizu | |
| 5,768,393 A | 6/1998 | Mukojima et al. | |
| 5,784,467 A | 7/1998 | Asayama | |
| 5,862,229 A | 1/1999 | Shimizu | |
| 5,926,400 A | 7/1999 | Kytle et al. | |
| 6,183,367 B1 | 2/2001 | Kaji et al. | |
| 6,219,045 B1 | 4/2001 | Leahy et al. | |
| 6,230,170 B1 | 5/2001 | Zellweger et al. | |
| 6,241,612 B1 | 6/2001 | Heredia | |
| 6,323,857 B1 | 11/2001 | Mielekamp et al. | |
| 6,352,476 B2 | 3/2002 | Miyamoto et al. | |
| 6,454,652 B2 | 9/2002 | Miyamoto et al. | |
| 6,519,629 B2 | 2/2003 | Harvey et al. | |
| 6,532,007 B1 | 3/2003 | Matsuda | |
| 6,612,931 B2 | 9/2003 | Kojima et al. | |
| 6,633,617 B1 | 10/2003 | Cooklev | |
| 6,772,195 B1 | 8/2004 | Hatlelid et al. | |
| 6,981,223 B2 * | 12/2005 | Becker et al. | 715/753 |
| 7,115,035 B2 | 10/2006 | Tanaka | |
| 7,124,372 B2 | 10/2006 | Brin | |
| 7,491,123 B2 | 2/2009 | Smith | |
| 7,512,656 B2 | 3/2009 | Tsuchiya | |
| 7,590,249 B2 | 9/2009 | Jang et al. | |

(Continued)

*Primary Examiner* — Steve Rowland
(74) *Attorney, Agent, or Firm* — Patrick J. S. Inouye; Krista A. Wittman; Leonid Kisselev (57) ABSTRACT

A system and method for providing text of interest to a player from text messages in an online game is provided. A player profile for a player participating in an online game is maintained. Text messages from sources in the online game are received substantially simultaneously within a buffer for a limited text area of a display during an online game session. A main conversation in which the player is involved with one of the sources from the text messages is identified and removed from the buffer. The text messages in the buffer not identified as the main conversation are analyzed for text of interest to the player included in the player profile. The text of interest is provided in the limited text area in the display interspersed with the main conversation concurrent to receipt of each text message within which the text of interest was included.

20 Claims, 8 Drawing Sheets

(56) References Cited

U.S. PATENT DOCUMENTS

| | | |
|---|---|---|
| 7,699,704 B2 | 4/2010 | Suzuki et al. |
| 7,828,657 B2 | 11/2010 | Booth |
| 2001/0029204 A1 | 10/2001 | Mizuno et al. |
| 2002/0165025 A1 | 11/2002 | Kawahara |
| 2003/0114218 A1* | 6/2003 | McClintic ................. 463/25 |
| 2004/0224772 A1* | 11/2004 | Canessa et al. ............. 463/42 |
| 2005/0149622 A1* | 7/2005 | Kirkland et al. ........... 709/207 |
| 2006/0075055 A1* | 4/2006 | Littlefield ................. 709/206 |
| 2006/0148551 A1* | 7/2006 | Walker et al. ............... 463/16 |
| 2007/0156886 A1* | 7/2007 | Srivastava ................. 709/224 |
| 2010/0217822 A1 | 8/2010 | Katis et al. |

* cited by examiner

SYSTEM AND METHOD FOR MANAGING A MULTIPLICITY OF TEXT MESSAGES IN AN ONLINE GAME

FIELD

This invention relates in general to online chat interfaces and, in particular, to a system and method for managing a multiplicity of text messages in an online game.

BACKGROUND

People have enjoyed playing games for thousands of years. The Egyptians had board games and the ancient Greeks held the Olympics. Interpersonal games provide entertainment, relaxation, and an opportunity for competition. Games also encourage people to come together and socialize. The advent of the personal computer and public data networks, such as the Internet, has led to the development of online games. Players from across the world connect and play games with, and against, one another. Online games are played solo, one on one, team versus team, and in many other scenarios.

In particular, massive multiplayer online games (MMOGs) involve hundreds to thousands of people playing simultaneously. The largest MMOGs have a player base, usually through subscriptions, of over ten million. MMOGs offer players a persistent gaming environment. Players create a character that serves as their in-game persona. Player achievements and character attributes persist even when a player is offline. The player can return to the game at any time and continue game play. Online virtual worlds are similar to MMOGs. Virtual worlds offer users the ability to interact with one another online via an avatar that they have created. Through their avatar, users can explore the virtual world and socialize with other users. Unlike MMOGs, the virtual worlds are not games, as there are no points, winners, or levels. Hybrid virtual worlds with attributes of online games are possible.

Although some challenges in MMOGs can be overcome by an individual player, many challenges require a team of players for successful outcome. Teamwork and online communication are vital. Currently, MMOG players, as well as users of virtual worlds, communicate online or "chat" primarily through text messaging, though audio and video messaging are increasingly available.

Currently, text messages received by, or typed by, a player are displayed in a chat box on a screen display. The chat box also displays text messages from other sources. Due to the large number of players, all of whom can interact at any time, a player can quickly become overloaded with text messages. The size of a chat box is fixed and only a limited number of lines of text can be displayed. To see more messages, a player must scroll up or down, meanwhile either ignoring incoming messages received and potentially missing useful information, or losing focus on their main conversation and activity.

Conventional techniques for differentiating text messages in a chat box mainly adjust message appearance or display. These techniques include color coding, filtering, adjusting font size, creating multiple chat boxes, and resizing and color coding chat boxes. Existing techniques of text message management fail to decrease the information load on players or increase the signal-to-noise ratio of messages of value to the player. The relative importance of each message to the player is ignored.

Therefore, an approach is needed to manage chat-based text messages in online gaming, virtual worlds, and similar online activity genre. Preferably, such an approach would reduce the amount of text that a player must process, while still allowing the player to notice and investigate information of likely importance.

SUMMARY

Players of online games can become overloaded with text messages due to the large number of other players who can interact with the player at any time. Currently, all text messages received from other players and automated sources scroll through a chat box. The limited space of the chat box creates difficulty for the player in following both the messages and the action of the game. Additionally, some of the messages will be of interest to the player while others are not. The systems and methods of this invention provide management of text messages received in an online game. A player profile including information about a player's character and the player himself is maintained in a database. Text message sent to the player are analyzed for text of interest based on the player profile. The identified text of interest is displayed in the chat box while the remaining text messages are not displayed. In a further embodiment, the text of interest is interspersed within a main conversation the player is involved in.

One embodiment provides a system and method for managing a multiplicity of text messages in an online game. A player profile of a player participating in an online game is maintained. A multiplicity of text messages is continuously received substantially simultaneously within a limited text area of a display during an active session of the online game. Text of interest is identified by analyzing each such text message against the player profile. The text of interest is provided in the display approximately concurrent to receipt of each such text message within which the text of interest was included.

A further embodiment provides a system and method for providing text of interest to a player from a multiplicity of text messages in an online game. A player profile comprising information about a player participating in an online game is persistently maintained. A multiplicity of text messages from message sources in the online game is continuously received substantially simultaneously to each other within a buffer for a limited text area of a display during an active session of the online game. A main conversation in which the player is involved with one of the sources from the text messages is identified. The main conversation is removed from the buffer. The text messages in the buffer not identified as the main conversation are analyzed for text of interest to the player included in the information in the player profile. The text of interest is provided in the limited text area in the display interspersed with the main conversation approximately concurrent to receipt of each text message within which the text of interest was included.

Still other embodiments will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Online Game Environment

Figure 1:
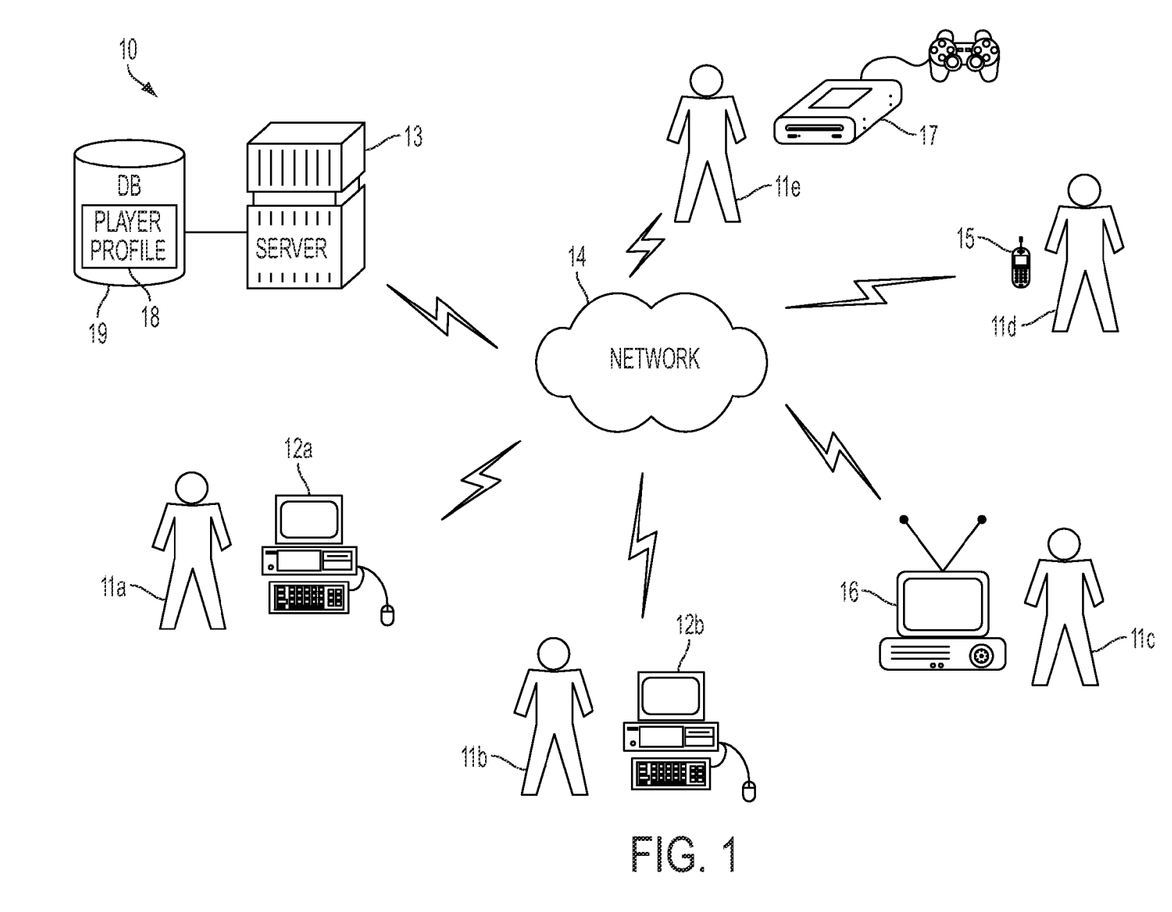
FIG. 1 is a functional block diagram showing, by way of example, an online game environment.

Conventional in-person games involve players who are physically located near one another, while online games involve players generally in remote locations who "meet" virtually over a network. FIG. 1 is a functional block diagram showing, by way of example, an online game environment 10. Each player 11a-e uses a computer 12a-b that is remotely interfaced to a server 13 over a public data communications network 14, such as the Internet, to participate in an online game. Additionally, the computers 12a-b can be interfaced via a telephone landline, wireless network, or cellular network. Other forms of remote interfacing and network configurations are possible.

Preferably, each computer is a general-purpose computing workstation, such as a personal desktop or notebook computer, for executing software programs, including Web browsers. The computer 12a-b includes components conventionally found in computing devices, such as a central processing unit, memory, input/output ports, network interface, and storage. Other user devices, systems, and components are possible, for example, Web-enabled cell phones 15, Web-enabled television set-top boxes 16, and gaming consoles 17. Each computer 12a-b is connected to a display having the capability to present text. Displays having other capabilities, such as the display of graphics, are more common. Various user input devices, for example, a keyboard, mouse, or game controller, are interfaced to the computer 12a-b. Other input devices, wired and wireless, are possible.

The computers 12a-b connect to the server 13, which enables the players 11a-e to participate in an online game. Users connect to virtual worlds in similar fashion. The server 13 functions as the hub of game play activity and enables the game environment 10 to continue, from a player's perspective, on an indefinite basis. Player information persists independently from active participation to enable players to log in or out of the game at will. Player profiles 18 are created and maintained by the server 13 in a database 19. Player profiles could also be stored locally. The server 13 is generally a server-grade computing platform configured as a uni-, multi- or distributed processing system, which includes those components conventionally found in computing devices, as discussed above.

One form of online game is a massively multiplayer online game (MMOG). A MMOG is presented to players as a persistent gaming environment in which the player's character and corresponding attributes are created and stored by a server. A player is a human who plays the game, while a character is a simulated being that is created and controlled by the player for use in the game. Tens of thousands of players can be simultaneously playing a MMOG. For example, World of Warcraft, developed by Blizzard Entertainment, Irvine, Calif., is a subscription-based MMOG having over ten million players. Players initially purchase the game software and afterwards pay a monthly subscription fee for continued access to the game. World of Warcraft takes place in a fantasy world of magic, demons, and warriors. A player uses his character to explore the virtual landscape of the game, fight monsters or other characters, undertake quests, and perform other virtual actions. Rewards in the game include money, items, and experience, which allow a player to increase the skill and power of his character or to earn other accolades. A player can have more than one character.

Figure 9:
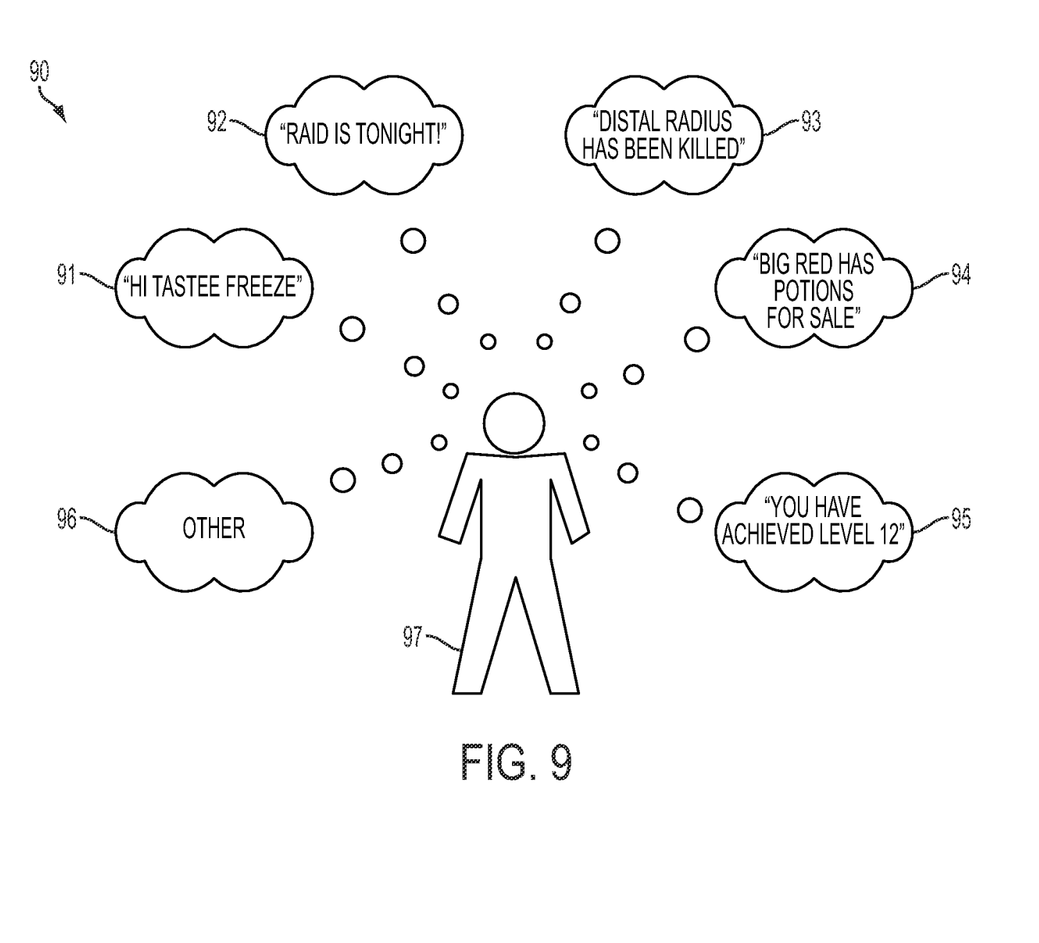
FIG. 9 is a block diagram showing, by way of example, text message types for use with the method of FIG. 4.

During play, players often receive a plethora of text messages, often closely spaced in time, as further discussed below with reference to FIG. 9. For example, private messages can only be seen by the message recipient player. Group messages are sent to all players that are members of a particular group. Clan or guild messages are similarly limited to members of a clan or guild. Additionally, any player that is within a limited "spatial" area receives spatial messages. Spatial messages are received when a recipient player is within a defined "zone" or fixed "distance" of another player. Further, non-chat messages relate to what is generally happening in the game or to a player's character, such as when advancing a level. Other types of text messages are possible. These various messages scroll through the chat box in order of receipt.

Figure 2:
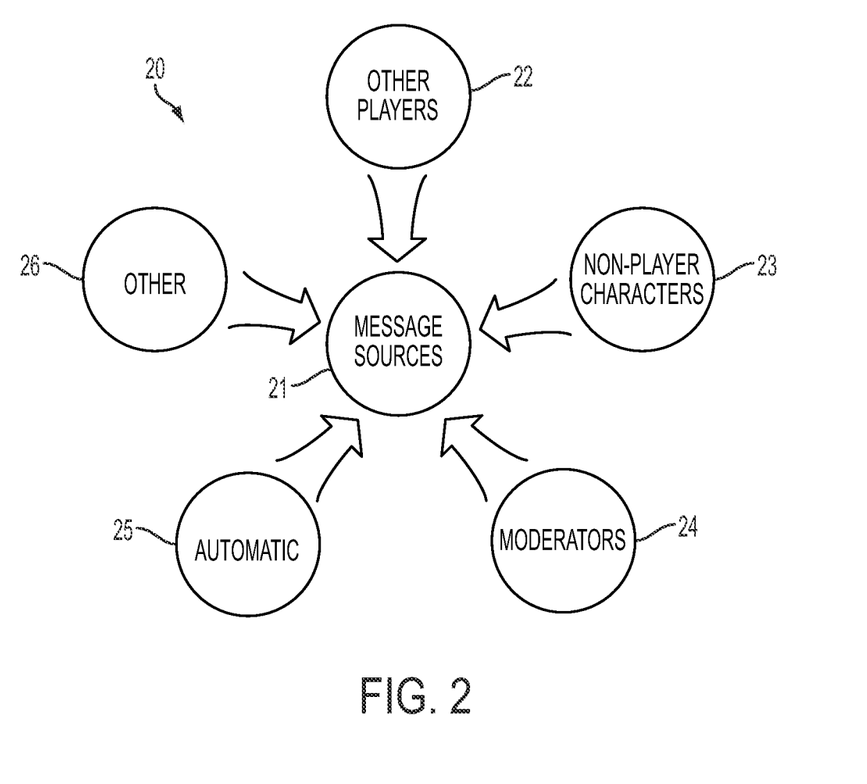
FIG. 2 is a data flow diagram showing, by way of example, text message sources.

The messages can be sent from a variety of sources, which only adds to the complexity of mentally processing messages whilst concurrently continuing game play. FIG. 2 is a data flow diagram showing, by way of example, categories 20 of text message sources 21. The sources 21 include messages from other players 22, non-player characters (NPCs) 23, moderators 24, or generated automatically 25. NPCs 23 are computer-controlled characters that interact with players through scripted events or artificial intelligence. NPCs 23 can be friendly, neutral, or hostile to players and, thus, can advise, train, or attack players. Moderators 24 are humans who enforce the rules of the game and prevent harassment of players by other players, known as griefing. Automatic 25 messages are triggered based on in-game actions or events and can include general game status or information. Other 26 message sources are possible online.

Furthermore, although MMOGs have been discussed above, other online games and activities follow similar formats. A player uses software, either purchased or downloaded for free, to enter the computer generated environment. Once in the environment, the player may explore and interact with the world and other players. One example of such online activity is virtual worlds. Virtual worlds and other computer-simulated online worlds allow users to interact over vast physical "terrains" where users can create any item of virtual property imaginable. "Inhabitants" of the virtual worlds communicate, play, and even conduct business using virtual alter egos, or avatars, of themselves. The avatars can collaborate on an objective, network with one another, or simply "wave" hello to a stranger. Virtual worlds often employ text-based chat boxes similar to that as described above for MMOGs. Accordingly, the discussion herein applies equally to these other on-line activities.

Online Game User Interface

Figure 3:
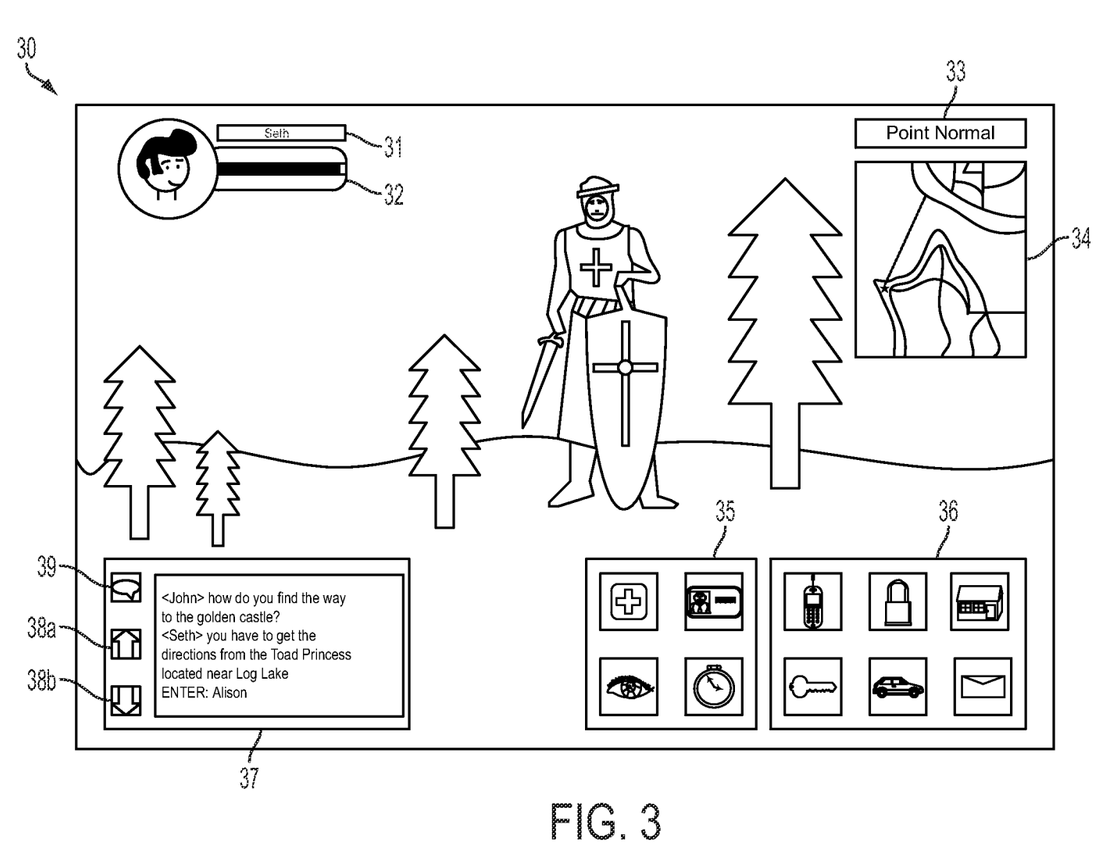
FIG. 3 is an exemplary screen shot of an online game.

Players of online games follow the game's action and receive information on a screen display, which represents the player's virtual "eyes" and "ears." FIG. 3 is an exemplary screen shot 30 of an online game. Although the exemplary screen shot 30 contains graphical elements, other controls and information displays are possible, for example, a display that presents only text.

In a graphical user interface, the game environment is presented through a first person's view or by some other perspective, such as an overhead map. For interactive online games, a character's name 31, health 32, and location 33 are often displayed. Other information could also be provided. An overhead map view 34 can be provided as a guide to the character's location within the game environment. Icon buttons display the character's inventory 35 of items and possible actions 36 that the player can take. A chat box 37 contains scroll up 38a and scroll down 38b buttons allowing the player to scroll though a buffer of text messages appearing outside the chat box 37. Chat button 39 toggles the ability of the player to chat "on" or "off." The buffer may store all messages received since the player logged in, or only a limited number of most recent messages. Due to the large number of messages that a player typically receives, the buffer can quickly fill up and overwhelm the player. Additionally, when only a limited number of messages are stored in the buffer, information of interest to the player can be lost due to the information being replaced by incoming messages.

Additionally, although game environments, such as MMOGs and virtual worlds simulate "conversation" between players, these environments lack real world physics. In the real world, having two ears placed on opposite sides of our heads allow us to hear in stereo and identify the direction and angle of a sound source. We are able to determine whether the source of a sound is near or far, left or right, and up or down compared to our location. In contrast, players only have one "ear" in-game in the form of the chat box. All messages sent within a zone, or "hearing" range, of the MMOG, or virtual world are received at the same "volume," which leads to a false impression as to the distance and direction of the source of the message to the recipient. Determining the location of a source of communication requires a player to reference some other information as to the nature of the source, which can distract the player and interrupt the continuity of the game play, as further described in commonly-assigned U.S. Patent Application Publication No. 2009-0253512, published Oct. 8, 2009, pending, the disclosure of which is incorporated by reference.

Method

Figure 4:
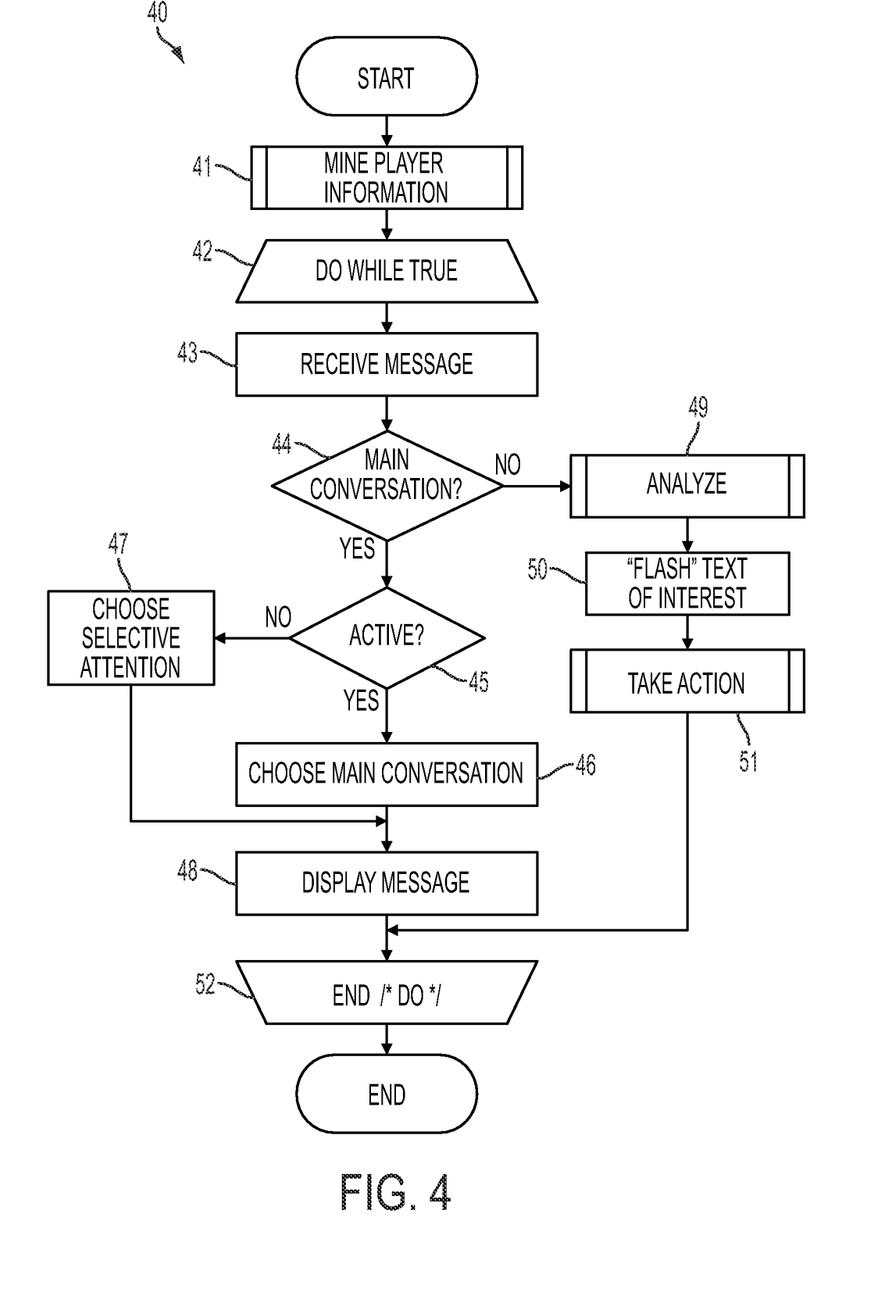
FIG. 4 is a flow diagram showing a method for managing a multiplicity of text messages in an online game, in accordance with one embodiment.

Online games provide a continuous stream of textual information in the form of messages to a player, much of which may be of little help or interest. The stream can be focused through use of the player's profile, which enables the player to control the text stream and to present only important or relevant information while remaining focused on the game. FIG. 4 is a flow diagram showing a method 40 for managing a multiplicity of text messages in an online game in accordance with one embodiment. The method 40 is performed as a series of process steps by the server 13, or any computing device connected to the network 14 with access to the text messaging stream.

By way of background, online games offer a rich set of meta, characteristic, behavioral, communicative, and other information about each player 11a-e. This player information can be mined (step 41) to identify information of likely interest to the player 11a-e, which can then be stored by the server 13 (shown in FIG. 1) as a player profile 18. Player information can include attributes of the player's character, as further described below with reference to FIG. 6, and details about the player 11a-e himself, as further described below with reference to FIG. 7. Other types of player information are possible.

Messages are continually received into a chat box 27 as a substantially simultaneous stream of text (steps 42-52). Text messages are received close enough in time whereby the player 11a-e can be overwhelmed with the volume of text messages received and have difficulty in mentally processing the messages. A chat box a finite display of text. For example, a chat box can be a framed "box" for displaying text, as shown in FIG. 3, or any other defined limited text display area. Each text message that a player 11a-e receives is temporarily stored or buffered (step 43). The buffer may store all messages received since log in, or only a limited number of most recent messages. The buffer is a holding area for the text messages that could be displayed, though not all buffered text messages need be displayed. A main conversation in which the player is participating is identified from the buffered text messages (step 44). In a further embodiment, the main conversation is removed, after identification, from the buffer of text messages. The main conversation can be identified directly by the player's 11a-e actions, such as by identifying the players 11a-e to whom messages are sent, or indirectly, such as described in commonly-assigned U.S. Pat. No. 7,698,141, issued Apr. 13, 2010, the disclosure of which is incorporated by reference. The main conversation can be a text exchange in which the player 11a-e is actively engaged or the player 11a-e can activate a selective attention mode (step 45). A player 11a-e is actively engaged in conversation (step 46) when the player 11a-e is participating in or focused on a specific conversation. The determination can be automated or player-controlled. The selective attention mode functions when a player 11a-e is not involved or actively engaged in a conversation (step 47), yet allows information of interest to be displayed, as discussed below. The selective attention mode can be engaged by the player 11a-e or automated. In a further embodiment, secondary, or side bar, conversations are identified as a main conversation (not shown). Unlike a primary conversation, where a player 11a-e is in a continuous conversation, secondary conversations are conversations where a player 11a-e has a short or temporary exchange with another player, though not fully focused on the secondary conversation. Secondary conversations can be in addition to or in the absence of a primary conversation. Other modes of main conversation processing or selection are possible.

The main conversation is displayed in the chat box 27 (step 48), but the rest of the text stream is omitted. In the background, each remaining text message that is not part of the main conversation is analyzed (step 49), based on the player profile 18, for information of possible interest to the player 11a-e and information of potential interest is extracted. The remaining text messages can come from a variety of sources, as further described below with reference to FIG. 9. In a further embodiment, the main conversation or secondary conversation, if applicable, are also analyzed. In a still further embodiment, the remaining text is analyzed by concurrently parsing the text for keywords defined in the player profile 18. After parsing, the keywords are analyzed, as further described below with reference to FIG. 5.

Text of interest is then flashed in-between the lines of the main conversation (step 50). Text of interest could also be flashed, for instance, in line with other messages or in a separate chat box. Text of interest is any information contained in a message sent to the player that is of possible significance to the player. The information can be related to the online game or extrinsic to the game. The determination of significance can be automated or player defined. The text of interest is preferably flashed a relatively short time after the originating message was received by the player. Otherwise, the value of the information can become stale. Text of interest may additionally be distinguished from the main conversation by font, font size, color, or other attribute. Additionally, an audio or visual alert can be used. Other distinguishing features are possible. The player 11a-e can then take action (step 51) on the flashed text of interest, such as selecting the text of interest to display the original context of the text of interest, as further described below with reference to FIG. 6. Processing continues with each successive message (step 52).

Flashed Text

Figure 5:
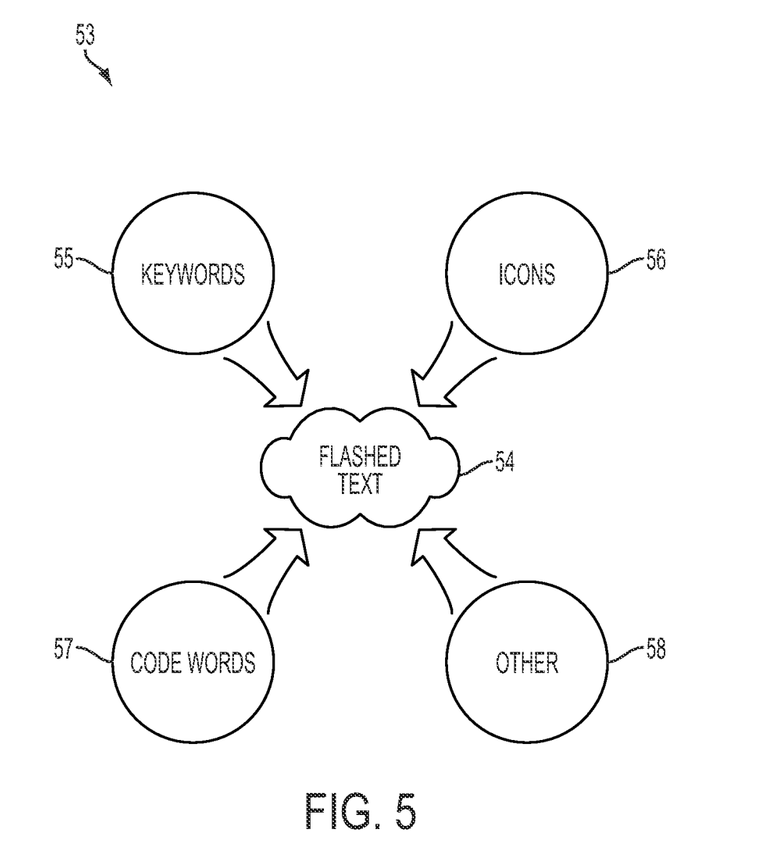
FIG. 5 is a data flow diagram showing, by way of example, flashed text for use with the method of FIG. 4.

Text of interest is "flashed" by including select portions of the non-main conversation text, that is, the "remaining text messages," in-between or interspersed within the main conversation. FIG. 5 is a data flow diagram showing, by way of example, various types 53 of flashed text 54. The flashed text 54 can include keywords 55, icons 56, and code words 57. Other 58 types of flashed text are possible. Keywords 55 are identified and extracted from the remaining text using an automated process, for example term frequency-inverse document frequency (TF-IDF). Keywords can also be from a set of "stock" keywords from character attributes or player details, as further described respectively below with reference to FIGS. 7 and 8. Similarly, the source or type of a message can trigger certain keywords, as further described, respectively, above with reference to FIG. 2 and below with reference to FIG. 9. Additionally, player-defined keywords 55 are possible. Icons 56 can be text-based or graphical symbols. Icons 56 can be defined by the player or generated automatically. Code words 57 replace the actual text of the message and signal the occurrence of remaining text having particular characteristics or source of origin. Other forms of code words 57 are possible.

Flashed Text Selection

Figure 6:
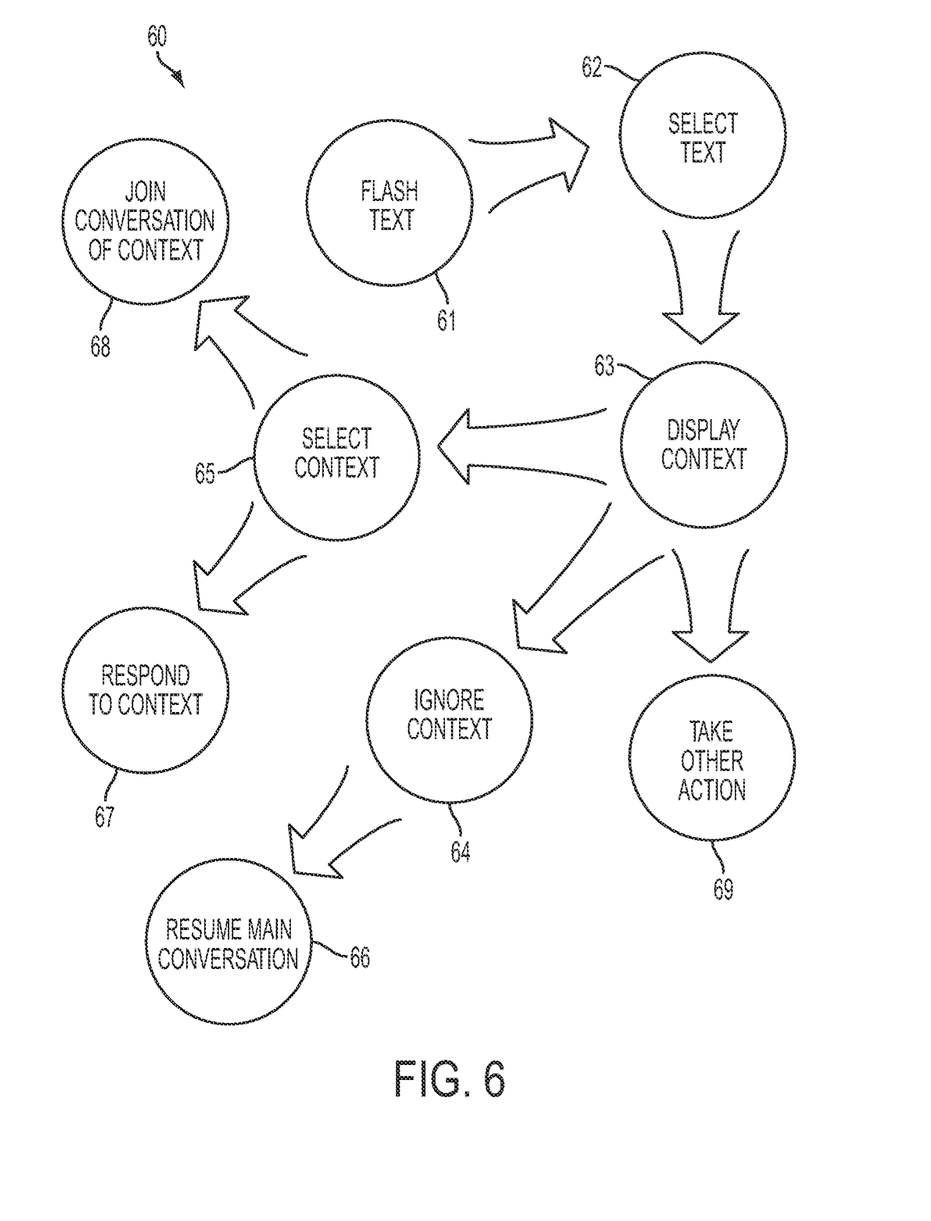
FIG. 6 is a process flow diagram showing flashed text selection for use with the method of FIG. 4.

After text has been flashed, a player can choose to ignore the information presented or investigate the information further. FIG. 6 is a process flow diagram showing flashed text selection 60 for use with the method 40 of FIG. 4. Text of interest is flashed 61 in-between or interspersed within the lines of the main conversation, or at another location. The player can select 62 the flashed text by clicking the text with a mouse or other pointing device. Upon selection 62, the context of the text of interest is displayed 63, either within the chat box or separately. The context displayed 63 may be the full message or sentence from which the text of interest was extracted or a sufficient portion of the full message to enable the player to gain a sense of the manner in which the text of information was used. The context can also be displayed 63 in the same window as the main conversation or in another window. Other methods of displaying the context 63 could also be used. After the context is displayed 63, the player may choose to ignore the context 64 or select the context 65. If the context is ignored 64, the player resumes the main conversation 66.

Selection of the context 65 allows the player to respond to the topic of the context 67 or join the conversation 68 from which the text of interest was extracted. Responding to the context 67 can include sending a text message to the player who sent the message from which the text of interest was extracted. Additionally, if the text of interest was taken from the context 63 of two other players, the player can join their conversation 68. Other post-context actions 69 are possible.

Character Attributes

Figure 7:
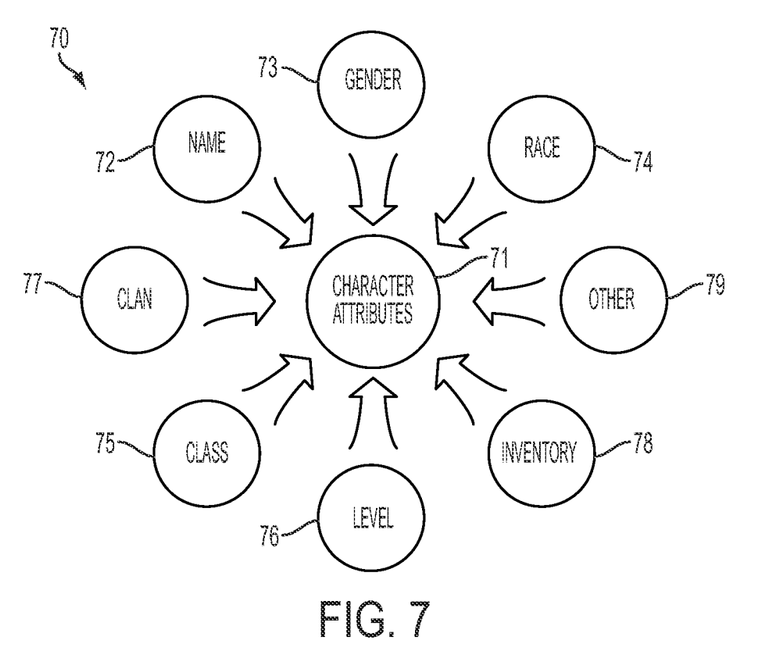
FIG. 7 is a data flow diagram showing, by way of example, character attributes for use with the method of FIG. 4.

Character attributes are a form of player information that can be used to define stock keywords. FIG. 7 is a data flow diagram showing, by way of example, categories 70 of character attributes 71 for use with the method 40 of FIG. 4. The attributes include name 72, gender 73, race 74, class 75, level 76, clan 77, and inventory 78 of the character. A character can have a real life race 74, such as Caucasian, or a fictitious race 74, like Elf or Troll. Character class 75 defines what abilities the character possesses. For example, if a character is a wizard, the character can perform spells, while a character with a class 75 of warrior cannot perform magic. A character's level 76 specifies the experience a character has attained. As a character's level 76 increases, the character can more easily defeat enemies and gains access to higher-level quests and game features. Clans 77 are groups of characters who maintain an alliance and fight together as a group. Each character has an inventory 78 of items that is useful in playing the game. Examples of inventory 78 items include armor, weapons, healing potions, scroll, and keys that open specific doors. Other 79 types of character attributes 71 are possible.

For example, a group of characters may be interested in forming a clan. The group would like to have a character of a certain class, such as Paladin, and level, such as Level 50, join their clan. As a Paladin character of Level 52 is wandering through a village on the way to a quest, he passes by as the group is discussing the addition of a Paladin. The keywords "Paladin," "Level 50," "join," and "clan" are flashed on the Paladin's screen based on the Paladin character fitting the class and level sought by the group.

Player Details

Figure 8:
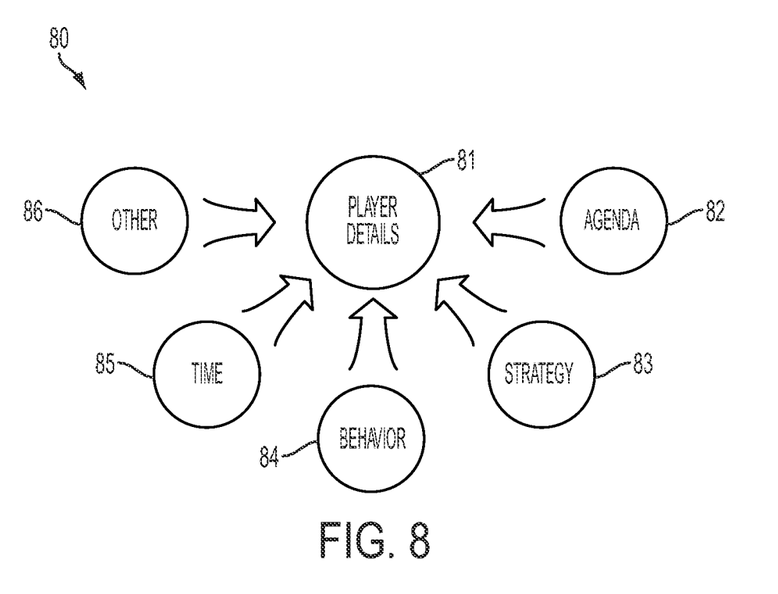
FIG. 8 is a data flow diagram showing, by way of example, player details for use with the method of FIG. 4.

Player details are a form of player information that can be used to define further stock keywords. FIG. 8 is a data flow diagram showing, by way of example, categories 80 of player details 81 for use with the method 40 of FIG. 4. The player details 81 include agenda 82, strategy 83, behavior 84, and time 85. Agenda 82 can include goals and interests of the player. Goals can include quests to undertake and groups to join. Interests can include game-related interests and extrinsic interests that a player may have that are unrelated to the game. For example, a player may be interested in a particular ability, such as blacksmithing. The player can add "blacksmithing" as a keyword, or "blacksmithing" can be automatically added by the system. Strategy 83 entails the player's approach to an obstacle or quest in the game. Behavior 84 reflects actions the player has taken during the game, such as areas in the game that the player has visited or challenges completed.

For example, a player may have undertaken a quest to find the "Sword of Forever" and failed. Later, as the player is doing other activities the keywords "sword" and "forever" are flashed because nearby, two other players were discussing how to get the Sword of Forever. The flashing of the text is due to the player's previous attempt to find the sword. Time 85 can include any time constraints or limit the player is under during the game. Other 86 types of player details are possible.

Text Message Types

Players receive text messages from a variety of sources in online games. FIG. 9 is a block diagram showing, by way of example, text message types 90 for use with the method 40 of FIG. 4. Types of text messages 90 that a player 97 can receive include private 91, clan 92, group 93, spatial 94, and non-chat 95. Other 96 types of text messages are possible. Private messages 91 are sent directly from a player to one or more other players. Private messages 91 are received only by the players to which the message was sent. Group messages 92 are received by all players that are in a particular group. Clan or guild messages 93 are sent to all members of the clan or guild. Spatial messages 94 are received by all players in the vicinity of the sending player. The vicinity can be within a "zone" of the game or a certain distance around the player 97. Non-chat messages 95 can relate to the development of a player's character or general game status information.

For example, a player's Elf character may possess a particular amulet, such as the "Amulet of Dragoon." Another player may desire, but unable to find, the amulet. The other player may send a message to all players within the "zone" where the amulet is supposed to be located asking to trade for the amulet. The keywords "Amulet," "Dragoon," and "trade" are flashed on the Elf's screen.

While the invention has been particularly shown and described as referenced to the embodiments thereof, those skilled in the art will understand that the foregoing and other changes in form and detail may be made therein without departing from the spirit and scope of the invention.

What is claimed is:

1. A system for managing a multiplicity of text messages in an online game, comprising:
   a database configured to maintain a player profile of a player participating in an online game;
   a user device, comprising:
      a communication module configured to continuously receive a multiplicity of text messages substantially simultaneously within a limited text area of a display during an active session of the online game;
      an identification module to identify a main conversation in which the player is involved from the text messages, the main conversation comprising one or more of the messages;
      an analysis module to identify one or more keywords of interest by analyzing each text message not in the main conversation against the player profile and by extracting the keywords from the respective text message;
      a display module to display the messages of the main conversation as one or more lines of text in the display and to intersperse the keywords into at least one of the lines of the text approximately concurrent to receipt of each text message not in the main conversation within which the keywords were comprised; and
      a context module to display the text message within which the keywords were comprised in the limited text area in response to a selection of the keywords by the player.

2. A system according to claim 1, wherein only those text messages not in the main conversation are analyzed.

3. A system according to claim 1, wherein the main conversation is identified from one of direct means and indirect means.

4. A system according to claim 1, wherein the main conversation is one of a primary conversation, a side bar conversation, and a selective attention mode.

5. A system according to claim 1, wherein the player profile comprises player details selected from the group comprising agenda, strategy, behavior, and time.

6. A system according to claim 1, wherein the player profile comprises character attributes selected from the group comprising name, gender, race, class, level, clan, and inventory.

7. A system according to claim 1, further comprising:
   a text type module to provide one or more of code words and icons based on the text message not in the main conversation.

8. A system according to claim 1, wherein the text messages are received from the group comprising other players, non-player characters, moderators, automated, private, clan, group, spatial, and non-chat.

9. A computer-implemented method for managing a multiplicity of text messages in an online game, comprising configuring a processor to perform the steps of:
   maintaining a player profile of a player participating in an online game;
   continuously receiving a multiplicity of text messages substantially simultaneously within a limited text area of a display during an active session of the online game;
   identifying a main conversation in which the player is involved from the text messages, the main conversation comprising one or more of the messages;
   identifying one or more keywords of interest by analyzing each text message not in the main conversation against the player profile and extracting the keywords from the respective text message; and
   displaying the messages of the main conversation as one or more lines of text in the display and interspersing the keywords into at least one of the lines of the text approximately concurrent to receipt of each such text message not in the main conversation within which the keywords were comprised; and
   displaying the text message within which the keywords were comprised in the limited text area in response to a selection of the keywords by the player,
   wherein the steps are performed by a suitably programmed computer.

10. A computer-implemented method according to claim 9, wherein only those text messages not in the main conversation are analyzed.

11. A computer-implemented method according to claim 9, wherein the main conversation is identified from one of direct means and indirect means.

12. A computer-implemented method according to claim 9, wherein the main conversation is one of a primary conversation, a side bar conversation, and a selective attention mode.

13. A computer-implemented method according to claim 9, wherein the player profile comprises player details selected from the group comprising agenda, strategy, behavior, and time.

14. A computer-implemented method according to claim 9, wherein the player profile comprises character attributes selected from the group comprising name, gender, race, class, level, clan, and inventory.

15. A computer-implemented method according to claim 9, further comprising:
   providing one or more of code words and icons based on the text message not in the main conversation.

16. A computer-implemented method according to claim 9, wherein the text messages are received from the group comprising other players, non-player characters, moderators, automated, private, clan, group, spatial, and non-chat.

17. A system for providing text of interest to a player from a multiplicity of text messages in an online game, comprising:
   a database configured to persistently maintain a player profile comprising information of interest to a player participating in an online game;
   a user device, comprising:
      a communication module configured to continuously receive a multiplicity of text messages from message sources in the online game substantially simultaneously to each other within a buffer for a limited text area of a display during an active session of the online game;
      an identification module to identify a main conversation in which the player is involved with one of the sources from the text messages and remove the main conversation from the buffer;
      an analysis module to analyze the text messages in the buffer not identified as the main conversation for one or more keywords of interest to the player matching the information of interest in the player profile and to extract the keywords from the respective text message;

a display module to display the main conversation as one or more lines of text in the limited text area in the display and to intersperse the keywords into at least one of the lines of the text of the main conversation approximately concurrent to receipt of each such text message within which the keywords were comprised.

18. A system according to claim 17, wherein the online game is selected from the group comprising massively multiplayer online games comprising a player-controlled character that advances in level through completion of missions and virtual worlds comprising an avatar socializing within a computer-simulated environment.

19. A computer-implemented method for providing text of interest to a player from a multiplicity of text messages in an online game, comprising configuring a processor to perform the steps of:

persistently maintaining a player profile comprising information about a player participating in an online game;

continuously receiving a multiplicity of text messages from message sources in the online game substantially simultaneously to each other within a buffer for a limited text area of a display during an active session of the online game;

identifying a main conversation in which the player is involved with one of the sources from the text messages and removing the main conversation from the buffer;

analyzing the text messages in the buffer not identified as the main conversation for keywords of interest to the player matching the information in the player profile and extracting the keywords from the respective text message; and displaying the main conversation as one or more lines of text in the limited text area in the display and interspersing the keywords into at least one of the lines of the text of the main conversation approximately concurrent to receipt of each such text message within which the keywords were comprised, wherein the steps are performed by a suitably programmed computer.

20. A computer-implemented method according to claim 19, wherein the online game is selected from the group comprising massively multiplayer online games comprising a player-controlled character that advances in level through completion of missions and virtual worlds comprising an avatar socializing within a computer-simulated environment.

* * * * *